US012707226B2

(12) United States Patent
Mcgrath et al.

(10) Patent No.: US 12,707,226 B2
(45) Date of Patent: Aug. 11, 2026

(54) EFFICIENT ORIENTATION TRACKING WITH FUTURE ORIENTATION PREDICTION

(71) Applicant: Dolby Laboratories Licensing Corporation, San Francisco, CA (US)

(72) Inventors: David S. Mcgrath, Rose Bay (AU); Jeremy Grant Stoddard, Gosford (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/690,787

(22) PCT Filed: Sep. 15, 2022

(86) PCT No.: PCT/US2022/076469
§ 371 (c)(1),
(2) Date: Mar. 11, 2024

(87) PCT Pub. No.: WO2023/044372
PCT Pub. Date: Mar. 23, 2023

(65) Prior Publication Data

US 2025/0142282 A1 May 1, 2025

Related U.S. Application Data

(60) Provisional application No. 63/374,633, filed on Sep. 6, 2022, provisional application No. 63/245,312, filed on Sep. 17, 2021.

(51) Int. Cl.
*H04S 7/00* (2006.01)
*G06F 3/01* (2006.01)

(52) U.S. Cl.
CPC ............. *H04S 7/304* (2013.01); *G06F 3/012* (2013.01)

(58) Field of Classification Search
None
See application file for complete search history.

(56) References Cited

U.S. PATENT DOCUMENTS 5,615,132 A 3/1997 Horton
5,645,077 A 7/1997 Foxlin
(Continued)

FOREIGN PATENT DOCUMENTS

CN 103003777 B 9/2016
CN 106249225 A 12/2016
(Continued)

OTHER PUBLICATIONS

Feng Qin, Xiangyu Sun, Tingting Yang, Dongdong Gong, Yicheng Wang, Yu Chen, Xiaoshi Li, Gang Dai, Jingfu Bao, Yijia Du; High acceleration and angular velocity micro vibrating platform with IMU ; Sensors and Actuators A: Physical, vol. 290, 2019, pp. 137-146, ISSN 0924-4247. 10 pages.
(Continued)

*Primary Examiner* — Antim G Shah

(57) ABSTRACT

The present disclosure relates to a method and system for predicting a future orientation of an orientation tracker (100). The method comprising obtaining a sequence of angular velocity samples, each angular velocity sample indicating an angular velocity at a point in time and obtaining a sequence of angular acceleration samples, each angular acceleration sample indicating an acceleration or deceleration of the angular velocity at each point in time. Wherein said method further comprises determining (S5*a*), for each point in time where the angular velocity is accelerating, a predicted orientation of the orientation tracker (100) based on a first order prediction of an accumulated rotation of the orientation tracker (100) and determining (S5*c*), for each point in time where the angular velocity is decelerating, a
(Continued)

predicted orientation of the orientation tracker (100) based on a second order prediction of the accumulated rotation of the orientation tracker (100).

15 Claims, 3 Drawing Sheets

(56) References Cited

U.S. PATENT DOCUMENTS

| | | | |
|---|---|---|---|
| 9,013,617 | B2 | 4/2015 | Ramachandran |
| 9,068,843 | B1 | 6/2015 | Sohn |
| 9,524,580 | B2 | 12/2016 | Katz |
| 9,857,885 | B2 | 1/2018 | Yamamoto |
| 9,897,807 | B2 | 2/2018 | Lavalle |
| 9,998,847 | B2 | 6/2018 | Norris |
| 10,026,233 | B2 | 7/2018 | Li |
| 10,102,666 | B2 | 10/2018 | Parker |
| 10,120,461 | B2 | 11/2018 | Cook |
| 10,182,303 | B1 | 1/2019 | Allen |
| 10,194,259 | B1 | 1/2019 | Martin |
| 10,469,974 | B2 | 11/2019 | Lyren |
| 10,582,328 | B2 | 3/2020 | Milevski |
| 10,621,751 | B2 | 4/2020 | Yang |
| 10,645,512 | B2 | 5/2020 | Norris |
| 10,964,030 | B2 | 3/2021 | Wang |
| 2014/0354515 | A1* | 12/2014 | LaValle .............. G02B 27/0093 345/8 |
| 2016/0077166 | A1 | 3/2016 | Morozov |
| 2017/0018121 | A1* | 1/2017 | Lawson ................. G06V 40/10 |
| 2017/0295446 | A1 | 10/2017 | Thagadur Shivappa |
| 2017/0352160 | A1 | 12/2017 | Tanaka |
| 2018/0053284 | A1 | 2/2018 | Rodriguez |
| 2018/0095529 | A1* | 4/2018 | Tokubo .............. G02B 27/0172 |
| 2019/0191263 | A1 | 6/2019 | Lyren |
| 2020/0094141 | A1 | 3/2020 | Fersch |
| 2020/0100045 | A1 | 3/2020 | Lyren |
| 2020/0236489 | A1 | 7/2020 | Merimaa |
| 2020/0359157 | A1 | 11/2020 | Lyren |
| 2020/0368616 | A1 | 11/2020 | Delamont |
| 2021/0082191 | A1 | 3/2021 | Tajik |
| 2021/0141443 | A1 | 5/2021 | Fukumoto |

FOREIGN PATENT DOCUMENTS

| | | | |
|---|---|---|---|
| CN | 111523076 | A | 8/2020 |
| CN | 109564504 | B | 9/2022 |
| JP | 2011121514 | A | 6/2011 |
| JP | 2015233252 | A | 12/2015 |
| JP | 2020524420 | A | 8/2020 |
| JP | 2021018638 | A | 2/2021 |
| JP | 2024508125 | A | 2/2024 |
| KR | 102134860 | B1 | 8/2020 |
| TW | 201523353 | A | 6/2015 |
| WO | 2022197987 | A1 | 9/2022 |

OTHER PUBLICATIONS

Henry Himberg et al: "A Multiple Model Approach to Track Head Orientation With Delta Quaternions", IEEE Transactions on Cybernetics, IEEE, Piscataway, NJ, USA, vol. 43, No. 1, Feb. 1, 2013 (Feb. 1, 2013), pp. 90-101, XP011487716. 12 pages.

P. Wang et al.; Calibration and Compensation of the Misalignment Angle Errors for the Disk Resonator Gyroscopes; 2020 IEEE International Symposium on Inertial Sensors and Systems (INERTIAL), 2020, pp. 1-3. 3 pages.

S. M. LaValle, A. Yershova, M. Katsev and M. Antonov; Head Tracking for the Oculus; Head tracking for the Oculus Rift, 2014 IEEE International Conference on Robotics and Automation (ICRA), May 31, 2014, pp. 187-194. 8 pages.

Zikan Karel et al: "Note on dynamics of human head motions and on predictive filtering of head-set orientations", SPIE Telemanipulator and Telepresence Technologies, vol. 2351, Dec. 21, 1995 (Dec. 21, 1995), pp. 328-336, XP093014314. 10 pages.

Ching-lang. Li et al., "Design and Implementation of Smart Multi-Touch Interface Using Special Purpose CORDIC Processor," in IEEE Transactions on Consumer Electronics, vol. 65, No. 4, pp. 516-525, Nov. 2019, doi: 10.1109/TCE.2019.2932465. (Year: 2019), 10 pages.

* cited by examiner

EFFICIENT ORIENTATION TRACKING WITH FUTURE ORIENTATION PREDICTION

CROSS-REFERENCE TO RELATED APPLICATIONS

This application is a U.S. National Stage application under U.S.C. 371 of International Application No. PCT/US2022/076469, filed on Sep. 15, 2022, which claims the benefit of U.S. Provisional Patent Application No. 63/245,312, filed Sep. 17, 2021, and U.S. Provisional Patent Application No. 63/374,633, filed Sep. 6, 2022; both of which are incorporated herein by reference in their entirety.

TECHNICAL FIELD OF THE INVENTION

The present disclosure relates to a method and system for predicting a future orientation of a motion tracker.

BACKGROUND OF THE INVENTION

In many applications, such as navigation, presentation of audio content and presentation of image or video content, the orientation of a user or a user device is tracked over time to control some type of operation. For instance, most smartphones are provided with an orientation tracker configured to determine the orientation of the smartphone to e.g. determine when to switch from a vertical to horizontal display mode, determine how to orient a map displayed on the smartphone or enable the smartphone to act as a window to an AR or VR environment.

Likewise, orientation tracking of a user consuming audio content has become increasingly important to enable enhanced user immersion by e.g. performing a rotational transformation of audio signals rendered to a set of earphones or earplugs based on an orientation of the user. Complex acoustic scenes, involving e.g. multiple spatial audio objects, can be rendered to binaural audio signals capable of accurately representing the acoustic scene for the user listening to the binaural audio signals. By further considering the current orientation of the user, obtained e.g. by measuring the user's orientation with an orientation sensor, a convincing acoustic effect may be created wherein the user is capable of moving inside a virtual acoustic scene as opposed to the virtual acoustic scene following the user (as is the case for e.g. traditional binaural or stereo audio rendered to earphones).

For instance, the user may be listening to binaural audio representing an acoustic scene in which a main audio source is placed directly in front of the user. As the user turns around in a counterclockwise direction the orientation tracker tracks the change in orientation and the binaural audio is processed accordingly such that the user perceives the main audio source to be located to the right of the user, then directly behind the user, and lastly to the left of the user. Accordingly, orientation tracking enables the user to move relative to objects in the (virtual) acoustic scene.

SUMMARY OF THE INVENTION

A problem with orientation tracking for this type of rotational audio processing is that the audio processing and rendering, which depends on the current orientation of the user, takes a non-negligible time to perform. Accordingly, there is a distracting delay of rotated audio content and the actual orientation of the user. In some cases, the orientation tracker is a part of a set of wireless earphones whereas the audio processing is performed by a smartphone connected to the wireless earphones which means that an additional non-negligible time is required to transfer information between the earphones and the smartphone in addition to the audio processing and rendering. In such situations, the time between the orientation tracker measuring a first orientation of the user and when the audio content rotated to the first orientation is first played back by the wireless earphones could be 200 milliseconds or more. Within this time the user will likely have moved to a second orientation different from the first orientation which causes a distracting delay effect as soon as the user's orientation changes.

To circumvent these drawbacks a solution has been proposed wherein a future orientation of the user is predicted and the predicted orientation is used for the audio processing as opposed to the current orientation. If the predicted orientation is done accurately the distracting delay is mitigated, however, most current proposed methods for prediction are inaccurate and computationally cumbersome, making prone to introduce undesired audio artifacts or ill-suited for implementation in low performance and/or portable battery powered devices.

It is therefore a purpose of the present disclosure to provide an improved method for performing orientation tracking.

A first aspect of the present invention relates to a method for predicting a future orientation of an orientation tracker. The method comprises obtaining a sequence of angular velocity samples, each angular velocity sample indicating an angular velocity of the orientation tracker at a point in time, and obtaining a sequence of angular acceleration samples, each angular acceleration sample indicating one of: an acceleration and a deceleration of the angular velocity of the orientation tracker at each point in time. The method further comprises determining, for each point in time when the angular velocity is accelerating, a predicted orientation of the orientation tracker after a predetermined prediction period of time based on a first order prediction of an accumulated rotation of the orientation tracker, where said first order prediction of the accumulated rotation is based on the accumulated rotation of the current angular velocity occurring during the prediction time. For each point in time where the angular velocity is decelerating, the method comprises determining a predicted orientation of the orientation tracker after a predetermined prediction period of time based on a second order prediction of the accumulated rotation of the orientation tracker, wherein the second order prediction of the accumulated rotation is based on the accumulated rotation of the current angular velocity and the current deceleration occurring during the prediction time.

It is understood that the term acceleration may in some contexts denote an acceleration or a deceleration. For instance, an object moving with angular velocity A rad/s with an angular acceleration of B rad/$s^2$, where A and B are non-negative numbers, means that the angular velocity of the object increases with B rad/$s^2$ while an angular acceleration of −B rad/$s^2$ means that the angular velocity is decreasing (decelerating) with B rad/$s^2$. Analogously, an object moving with angular velocity −A rad/s with an angular acceleration of B rad/$s^2$ means that the angular velocity of the object decreases (decelerating) with B rad/$s^2$ while an angular acceleration of −B rad/$s^2$ means that the angular velocity is increasing with B rad/$s^2$. Accordingly, acceleration and velocity values with a positive and negative sign may be used interchangeably with the terms acceleration (the angular velocity increases) and deceleration (the angular velocity decreases).

The predetermined prediction period of time may be expressed in units of time or, equivalently, in number of samples. Moreover, it is understood that the samples may be original samples from an orientation tracker or samples being a combination of (e.g. in terms of mean or average) multiple original samples, with finer granularity, from an orientation tracker. It is envisaged that the samples may be samples of a continuous signal or a downsampled/upsampled version of an original sequence of samples. For instance, each sample may represent the angular velocity and angular acceleration during a corresponding time segment of a series of time segments, where the time segments are partially overlapping in time or not overlapping in time.

The first aspect of the invention is at least partially based on the understanding that a computationally efficient method for predicting the orientation of a head tracker for audio processing purposes is achieved by using a simple, first order, predictor in situations when the orientation tracker is accelerating and a more sophisticated, second order, predictor in situations when the orientation tracker is decelerating. When a user listens to audio content which is rendered based on the user's orientation the inventors have realized that a first order predictor, while being less accurate, is sufficient in situations when the change in the user's orientation is accelerating while it is more important to allocate computational resources to accurate prediction when the change in the user's orientation is decelerating.

When accelerating, a user is often incapable of noticing minor discrepancies between the instantaneous orientation of the user and the rendered audio content. However, as soon as the user's orientation starts to decelerate (even when the initial velocity is high) users are immediately more sensitive to discrepancies between the instantaneous orientation and the rendered audio content. To this end, the more computationally expensive second order predictor is used when the orientation tracker tracking the user's orientation detects a deceleration and the less computationally expensive first order predictor is used when the orientation tracker tracking the user's orientation detects an acceleration.

In some implementations, the method further comprises determining, for each point in time where the angular velocity is below a predetermined velocity threshold, a predicted orientation of the orientation tracker after a predetermined prediction period of time based on the first order prediction of an accumulated rotation of the orientation tracker.

That is, the computationally efficient first order predictor is used for any point in time wherein the angular velocity sample indicates an angular velocity below the predetermined velocity threshold. For small velocities, the discrepancies between the instantaneous orientation of the user and the rendered audio content are minor and not as noticeable even if the user's orientation change is decelerating. It is understood that the angular velocity threshold imposes a limit for the absolute angular velocity i.e. a limit regardless of the sign (positive or negative) of the angular velocity.

In some implementations, for each point in time where the angular velocity is decelerating with a decelaration above a deceleration threshold, the predicted orientation of the orientation tracker after the predetermined prediction time is based on a shortened second order prediction of the accumulated rotation of the orientation tracker, wherein the shortened second order prediction of the accumulated rotation is based on the accumulated rotation of the current angular velocity and the current deceleration occurring during a second prediction time, wherein the prediction time is longer than the second prediction time.

With an angular velocity which is decelerating with a declaration above a deceleration threshold it is meant that the rate at which the angular velocity approaches zero exceeds the predetermined deceleration threshold. For instance, if an object has an angular velocity of +A rad/s and the acceleration is −B rad/s$^2$ (meaning that a deceleration is occurring) and the deceleration threshold is B/2 rad/s$^2$ (in absolute terms) the acceleration/deceleration is above the deceleration threshold since the rate of deceleration exceeds the threshold rate of deceleration.

Accordingly, a modified version of the second order predictor (the shortened second order predictor) is used in situations with a high rate of deceleration as the inventors have realized that an overshooting audio artifact may occur at high rates of deceleration which is mitigated or eliminated completely by the use of the shortened second order predictor.

In some implementations, the method further comprises, determining for each point in time where the angular velocity is decelerating, a scale factor. Wherein said second order prediction of the accumulated rotation of orientation tracker is based on the first order prediction scaled with the scale factor.

That is, to further enhance the computational efficiency, it has been realized that the first and second order prediction (indeed also the shortened second order prediction) are linked via a single scaling factor. Accordingly, evaluation of different functions are not necessarily needed when switching from one type of prediction to another as it suffices to update the value of a single scaling factor. For instance, the second order prediction is calculated as the first order prediction multiplied with the scaling factor.

According to second aspect of the invention there is provided an orientation predictor arrangement, configured to perform the method according to the first aspect.

According to a third aspect of the invention there is provided a computer program product comprising instructions which, when the program is executed by a computer, cause the computer to carry out the method of the first aspect.

Any functions described in relation to a method may have corresponding features in a system or device and vice versa.

BRIEF DESCRIPTION OF THE DRAWINGS

The aspects of the present invention will be described in more detail with reference to the appended drawings, showing currently preferred embodiments of the invention.

FIG. **5*a*** illustrates a user facing a first direction and listening to an audio presentation adapted based on the direction which the user faces according to an implementation.

Figure 5A:
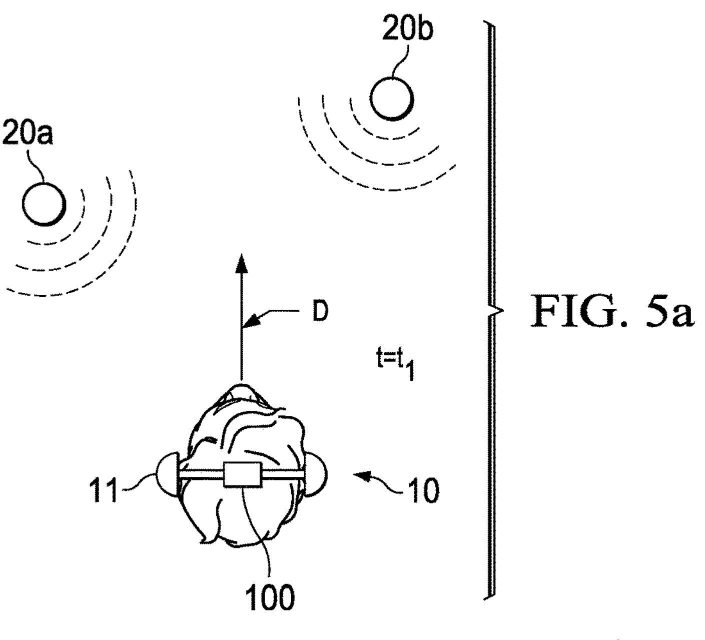
Figure 5B:
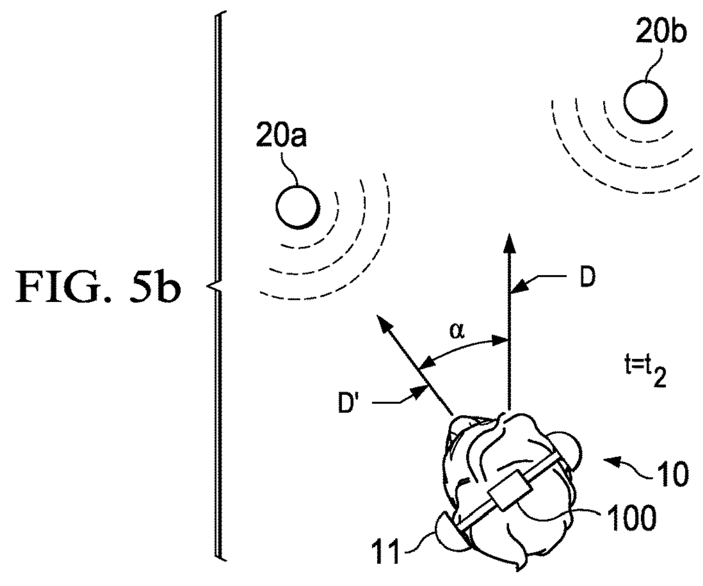

FIG. 5*b* illustrates the user facing a second direction and listening to an audio presentation adapted based on the direction which the user faces according to an implementation.

DETAILED DESCRIPTION OF CURRENTLY PREFERRED EMBODIMENTS

Systems and methods disclosed in the present application may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation.

The computer hardware may for example be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that computer hardware. Further, the present disclosure shall relate to any collection of computer hardware that individually or jointly execute instructions to perform any one or more of the concepts discussed herein.

Certain or all components may be implemented by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system (i.e. a computer hardware) that includes one or more processors. Each processor may include one or more of a CPU, a graphics processing unit, and a programmable DSP unit. The processing system further may include a memory subsystem including a hard drive, SSD, RAM and/or ROM. A bus subsystem may be included for communicating between the components. The software may reside in the memory subsystem and/or within the processor during execution thereof by the computer system.

The one or more processors may operate as a standalone device or may be connected, e.g., networked to other processor(s). Such a network may be built on various different network protocols, and may be the Internet, a Wide Area Network (WAN), a Local Area Network (LAN), or any combination thereof.

The software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, physical (non-transitory) storage media in various forms, such as EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media (transitory) typically embodies computer readable instructions, data structures, program modules or other data in a modulated data signal such as a carrier wave or other transport mechanism and includes any information delivery media.

Figure 1:
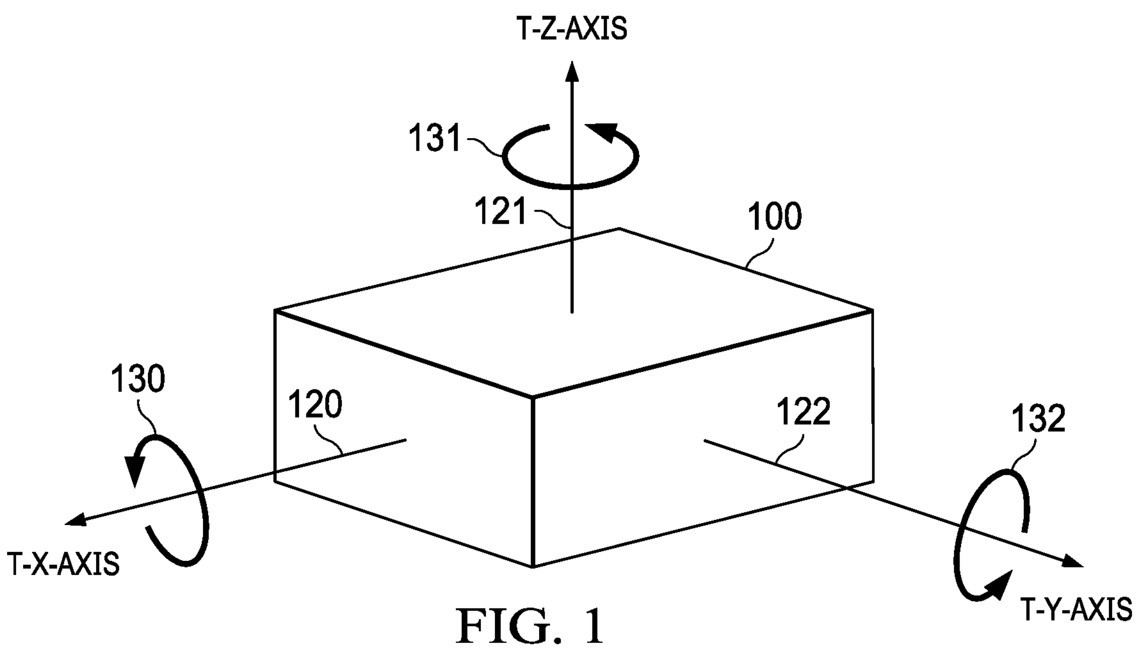
FIG. 1 illustrates an orientation tracker in a tracker (T) coordinate system according to some implementations.

With reference to FIG. 1 there is illustrated an orientation tracker 100 configured to determine its orientation around three axes 120, 121, 122.

The location of objects in the vicinity of the orientation tracker may be defined in terms of the Tracker (T) coordinate system, relative to the axes T-X-Axis 120, T-Y-Axis 122 and T-Z-Axis 121. This coordinate system is referred to as the T-frame and the axes 120, 121, 122 of the T-frame are anchored to the orientation tracker 100 and will therefore rotate along with the orientation tracker 100.

To enable orientation tracking the orientation tracker 100 may comprise one or more sensors that enable the orientation of the device to be determined. The one or more sensors may be gyros, magnetometers and/or accelerometers. It is also understood that while the embodiment of FIG. 1 determines the orientation of the orientation tracker 100 around three axes 120, 121, 122 the orientation tracker 100 may be configured to determine its orientation around only one or only two axes.

The orientation tracker 100 may be attached to a user device, such as a set of earphones, a smartphone, a smartwatch or any type of user device, so that the orientation of the user device (and/or the user wearing or holding the user device) around one, two or three axes may be determined.

The orientation tracker 100 may comprise one, two or three gyros, each of which measures the rate of rotation (angular velocity 130, 131, 132) around one axis of rotation. An arrangement of three gyros may also be referred to as a Three-Axis gyro.

The orientation tracker 100 may comprise three magnetometers, each of which measures the component of the local magnetic field along one axis. The arrangement of three magnetometers may also be referred to as a Three-Axis magnetometer The orientation tracker 100 may comprise three accelerometers, each of which measures the acceleration of the device along one axis. The arrangement of three accelerometers may also be referred to as a Three-Axis accelerometer.

The sensors of the orientation tracker 100 are mounted so as to capture measurements of orientation relative to three axes of a right-handed coordinate system, wherein the axes are labelled as the X-axis 120, a Z-axis 121 and a Y-axis 122.

The measurements of a gyro may be represented as a vector of three time-varying quantities:

$$Gyr(t) = \begin{pmatrix} Gyr_x(t) \\ Gyr_y(t) \\ Gyr_z(t) \end{pmatrix}. \tag{1}$$

The vector Gyr(t) vector represents the angular velocities 130, 131, 132 of rotation about three orthogonal axes as function of time and the angular velocities 130, 131, 132 may be presented in any suitable unit, such as degrees per second or radians per second. In the following description it will be assumed that any angular velocity is expressed as radians per second, however it is understood that the same principles apply regardless of the unit used to represent the angular velocity.

It is noted that when fewer than three gyros are used, one or more of the elements of the Gyr(t) vector may be zero or omitted. For instance, if two gyros are used the vector Gyr(t) only comprises two elements or two elements that are not zero for each time t.

The vector Gyr(t) may be represented in terms of a single rotation component, rotating at ω(t) radians per second around an axis defined by the unit-vector $U_{rot}(t)$, where:

$$\omega(t) = \sqrt{Gyr_x(t)^2 + Gyr_y(t)^2 + Gyr_z(t)^2} \tag{2}$$

and $$U_{rot}(t) = \frac{1}{\omega(t)} Gyr(t). \tag{3}$$

In the special case where a single gyro is used, this gyro may without loss of generality be defined as the Z-axis gyro (so that $Gyr_x(t)$ and $Gyr_y(t)$ are both zero or omitted) which gives e.g. $\omega(t)=Gyr_z(t)$ and $U_{rot}(t)=[0, 0, 1]^T$.

Similarly, magnetometer measurements and accelerometer measurements may be represented as single rotation component or as a respective vector of three time-varying quantities indicative of the angular velocity around each of the three axes 120, 121, 122 as $$Mag(t) = \begin{pmatrix} Mag_x(t) \\ Mag_y(t) \\ Mag_z(t) \end{pmatrix}, Acc(t) = \begin{pmatrix} Acc_x(t) \\ Acc_y(t) \\ Acc_z(t) \end{pmatrix}. \tag{4}$$

The gyro, magnetometer or accelerometer measurements may also be sampled at regular time intervals and if the time between samples is ΔT then the sampled values at sample number n may be defined for the gyro measurements as $$Gyr(n) = \begin{cases} Gyr_x[n] = Gyr_x(n\Delta T) \\ Gyr_y[n] = Gyr_y(n\Delta T) \\ Gyr_z[n] = Gyr_z(n\Delta T) \end{cases} \tag{5}$$

and analogously for the magnetometer or accelerometer measurements. Additionally, the rotation velocity ω and unit vector $U_{rot}$ may also be sampled at regular time intervals which gives:

$$\omega[n] = \Delta T \omega(n\Delta T) \tag{6}$$

and $$U_{rot}[n] = U_{rot}(n\Delta T) \tag{7}$$

wherein it is noted that according to equation 6 above, the time-sampled angular velocity samples have been scaled by ΔT to be in units of radians per sample (instead of radians per second).

Figure 2:
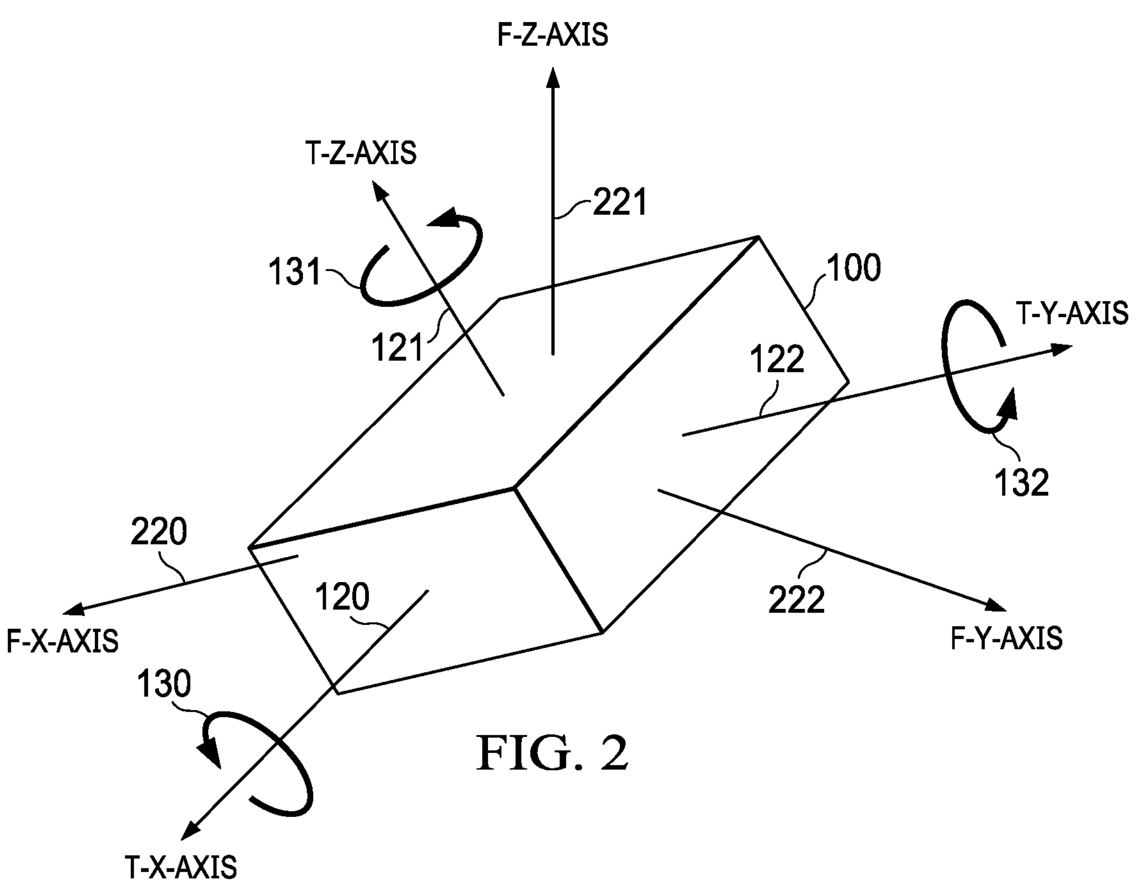
FIG. 2 illustrates an orientation tracker in a tracker (T) and floating (F) coordinate system according to some implementations.

FIG. 2 illustrates a fixed (or floating) frame of reference defined by the three axes, F-X-Axis 220, F-Y-Axis 222 and F-Z-Axis 221. This fixed (or floating) frame of reference will be referred to as the F-frame. Without loss of generality, it can be assumed that the origin of the F-frame coincides with the origin of the T-frame. The three axes of the F-frame 220, 221, 222 define a mostly stationary frame of reference.

The orientation tracker 100 is present in a same space spanned by the T-frame and F-frame respectively and the location of any object that exists in the space around the orientation tracker 100 may be defined according to coordinates in either the T-frame or the F-frame:

$$Loc_T = \begin{pmatrix} x_T \\ y_T \\ z_T \end{pmatrix}, Loc_F = \begin{pmatrix} x_F \\ y_F \\ z_F \end{pmatrix} \tag{8}$$

wherein the $Loc_T$ and $Loc_F$ coordinates are related according to a rotation matrix $M_{TF}$:

$$\begin{pmatrix} x_F \\ y_F \\ z_F \end{pmatrix} = M_{TF} \times \begin{pmatrix} x_T \\ y_T \\ z_T \end{pmatrix} \tag{9}$$

It will be appreciated that the orientation of the orientation tracker 100 within the F-frame is fully described by the rotation matrix $M_{TF}$. It will also be appreciated by those skilled in the art that the rotation matrix $M_{TF}$ may be fully described in terms of a unit-quaternion $Q_{TF}$:

$$Q_{TF} = \begin{pmatrix} w_{TF} \\ z_{TF} \\ y_{TF} \\ z_{TF} \end{pmatrix} \tag{10}$$

where $$w_{TF}^2 + x_{TF}^2 + y_{TF}^2 + z_{TF}^2 = 1.$$

A unit-quaternion can be converted to a rotation matrix using the function R, wherein $$R([w, x, y, z]^T) = \begin{pmatrix} 1-2y^2-2z^2 & 2xy-2zw & 2xz+2yw \\ 2xy+2zw & 1-2x^2-2z^2 & 2yz-2xw \\ 2xz-2yw & 2yz+2xw & 1-2x^2-2y^2 \end{pmatrix} \tag{11}$$

meaning that $M_{TF}=R(Q_{TF})$. Moreover, the product of two quaternions may be computed as $$\begin{pmatrix} w_a \\ x_a \\ y_a \\ z_a \end{pmatrix} \times \begin{pmatrix} w_b \\ x_b \\ y_b \\ z_b \end{pmatrix} = \begin{pmatrix} w_a w_b - x_a x_b - y_a y_b - z_a z_b \\ w_a x_b + x_a w_b + y_a z_b - z_a y_b \\ w_a y_b - x_a z_b + y_a w_b + z_a x_b \\ w_a z_b + x_a y_b - y_a x_b + z_a w_b \end{pmatrix}. \tag{12}$$

In one implementation, the orientation tracker includes gyro sensors that measure the angular velocity, 131, 132, 133, of the orientation tracker 100 around one or more of the three axes, 120, 121, 122 of the T-frame. This angular velocity data may be in the form of three angular velocity measurements as defined in equation 1, or as the time-sampled quantities, wherein sample n is sampled at time t=ΔTn shown in equation 5.

For instance, the time-sampled gyroscope values are converted into unit-vector/rotation form according to:

$$\omega[n] = \Delta T \sqrt{Gyr_x[n]^2 + Gyr_y[n]^2 + Gyr_z[n]^2} \tag{13}$$

and

-continued $$U_{rot}[n]=\frac{1}{\sqrt{Gyr_x[n]^2+Gyr_y[n]^2+Gyr_z[n]^2}}\begin{pmatrix}Gyr_x[n]\\Gyr_y[n]\\Gyr_z[n]\end{pmatrix} \quad (14)$$

where the rotation rate of the orientation tracker is ω[n] radians per sample interval around the axis defined by the unit-vector $U_{rot}$[n].

Using the time-sampled unit-vector/rotation data at sample-time n, the orientation of the orientation tracker 100 at sample time n can be calculated in terms of the quaternion $Q_{TF}$[n] as follows:

$$Q_{TF}[n]=Q_{TF}[n-1]\times\Delta Q_T[n] \quad (15)$$

wherein $$\Delta Q_T[n]=\begin{pmatrix}\cos\frac{\omega[n]}{2}\\ \sin\frac{\omega[n]}{2}(U_{rot}[n])_x\\ \sin\frac{\omega[n]}{2}(U_{rot}[n])_y\\ \sin\frac{\omega[n]}{2}(U_{rot}[n])_z\end{pmatrix}. \quad (16)$$

It will be appreciated by those skilled in the art that $Q_{TF}$[n] from equation 15 will determine the orientation of the orientation tracker device relative to the F-frame but the orientation of the F-frame, relative to an external world frame, is arbitrary, since at each sample interval, n, the orientation is determined based on the orientation in the prior sample interval, n−1. Equation 15 can be modified with an incremental rotation to make use of an additional quaternion update in each sample interval, so as to adjust the orientation of the F-frame relative to the external world frame, to e.g. ensure that the F-Z-axis 221 of the F-frame is pointing in an approximately vertical direction and that the F-X-Axis 220 or F-Y-Axis 222 is pointing approximately towards magnetic North. This incremental rotation, used to slowly align the F-frame with the external world frame, may be computed by use of accelerometers and/or magnetometers. When the orientation tracker 100 only comprises accelerometers, the resulting incremental rotation operation will only maintain a valid alignment of the F-Z-Axis 221 (in the vertical direction utilization the gravitational force) and the F-X-Axis 220 and F-Y-Axis 222 may point in an arbitrary direction, and it may drift over time, due to inaccuracies in the angular velocity measurements. However, if the orientation tracker 100 comprises magnetometers incremental orientation will maintain a valid alignment of the F-frame relative the external world frame.

The quaternion $\Delta Q_F$[n] is defined to be the quaternion that represents the incremental rotation of the F-frame, at sample interval n, that realigns the F-frame with the external world frame. The incremental rotation, $\Delta Q_F$[n], may be used to form an enhanced version of equation 15, which takes the incremental rotation of the F-frame into account:

$$Q_{TF}[n]=\Delta Q_F[n]\times Q_{TF}[n-1]\times\Delta Q_T[n]. \quad (17)$$

If the incremental rotation is not considered equation 15 may be used instead of equation 17. Alternatively, if the incremental rotation is not considered $\Delta Q_F$[n] may be set to $\Delta Q_F[n]=[1, 0, 0, 0]^T$. As a further example, if no magnetometer data is available, $\Delta Q_F$[n] comprises no information regarding rotation around the external F-Z-axis meaning that $\Delta Q_F[n]=[w, x, y, 0]^T$.

In order to predict the orientation of the orientation tracker 100 a number of samples into the future a future orientation, $$Q_{TF}^{pred}[n+L],$$

may be determined by applying an additional prediction quaternion, $P_L$[n], wherein $$Q_{TF}^{pred}[n+L]=Q_{TF}[n]\times P_L[n] \quad (18)$$

wherein the prediction quaternion $P_L$[n] is given by $$P_L[n]=\begin{pmatrix}\cos\frac{\gamma^{pred}[n]}{2}\\ \sin\frac{\gamma^{pred}[n]}{2}(U_{rot}[n])_x\\ \sin\frac{\gamma^{pred}[n]}{2}(U_{rot}[n])_y\\ \sin\frac{\gamma^{pred}[n]}{2}(U_{rot}[n])_z\end{pmatrix} \quad (19)$$

where $\gamma^{pred}$[n] is a first order predictor which may be defined as:

$$\gamma^{pred}[n]=\gamma_1^{pred}[n]=L\omega[n] \quad (20)$$

so that the first order rotation angle, $$\gamma_1^{pred}[n],$$

of the prediction quaternion $P_1$[n] is Lω[n] radians, is L times larger than the rotation angle, ω[n], of the incremental quaternion $\Delta Q_T$[n]. The prediction quaternion $P_L$[n] is therefore applying a rotation that corresponds to the predicted rotation of the orientation tracker device 100 over L sample intervals (which is ΔTL seconds) under the assumption that the current angular velocity of the orientation tracker 100 (i.e. ω[n] around $U_{rot}$[n] or Gyr(t)) remains constant over that time interval.

An alternative derivation of the prediction quaternion $P_L$[n] may be defined by observing that the prediction rotation is equivalent to multiple repeated applications of the incremental quaternion $\Delta Q_T$[n] (equivalent to taking the incremental quaternion raised to the power of L):

$$P_L[n]=(\Delta Q_T[n])^L. \quad (21)$$

A second order predictor $$\gamma_2^{pred}[n]$$

is created by taking the angular acceleration a[n] into account. The angular acceleration a[n] may be determined as $$a[n]=\omega[n]-\omega[n-1] \tag{22}$$

with a unit of radians per sample squared. Although it is envisaged that the angular acceleration may be determined in methods other than using equation 22, e.g. more than one previous angular velocity measurements (ω[n−1], ω[n−2]) may be considered or the orientation tracker 100 may output an angular acceleration value alongside the angular velocity value. The second order predictor $$\gamma_2^{pred}[n]$$

may be based on the assumption that the angular acceleration a[n] remains constant for the next L sample intervals. That is, the predicted future values of the angular velocity may be given by $$\omega^{pred}[n+k]=\omega[n]+ka[n],\ 0<k\le L. \tag{23}$$

Using the future predicted values of the angular velocity, as shown in equation 23, the accumulated angular rotation over the future L sample intervals can be predicted according to:

$$\gamma_2^{pred}[n]=\sum\nolimits_{k=1}^{L}\omega^{pred}[n+k]=L\omega[n]+\frac{1}{2}a[n]L^2. \tag{24}$$

That is, equation 20 provides a means for estimating the future angular rotation of the orientation tracker 100 using a first-order prediction method. In comparison, equation 24 provides a means for estimating the future angular rotation of the orientation tracker 100 using a second-order prediction method.

The second order predictor $$\gamma_2^{pred}[n]$$

of equation 24 may also be rewritten in terms of the first order predictor $$\gamma_1^{pred}[n]$$

and a scale factor β[n] according to:

$$\begin{aligned}\gamma_2^{pred}[n]&=L\omega[n]+\frac{1}{2}a[n]L^2\\&=L\omega[n]\left(1+\frac{1}{2}\frac{a[n]}{\omega[n]}L\right)\\&=\gamma_2^{pred}[n]\beta[n]\end{aligned} \tag{25}$$

where the scale factor β[n] is defined as $$\beta[n]=1+\frac{1}{2}\frac{a[n]}{\omega[n]}L. \tag{26}$$

In one implementation, the prediction of the future angular rotation of the orientation tracker 100 is adapted to use the first order prediction method in some circumstances and the second order prediction method in other circumstances. This is referred to as a sesqui-order predictor, defined as:

$$\gamma_{sesqui}^{pred}[n]=\gamma_1^{pred}\beta[n] \tag{27}$$

where β[n] is varied to provide behavior that dynamically changes between first-order and second-order prediction.

It will be appreciated that setting β[n]=1 will result in a future angular prediction that corresponds to the first-order prediction and setting $$\beta[n]=1+\frac{1}{2}\frac{a[n]}{\omega[n]}L$$

will result in a future prediction that corresponds to the second-order prediction.

Figure 3:
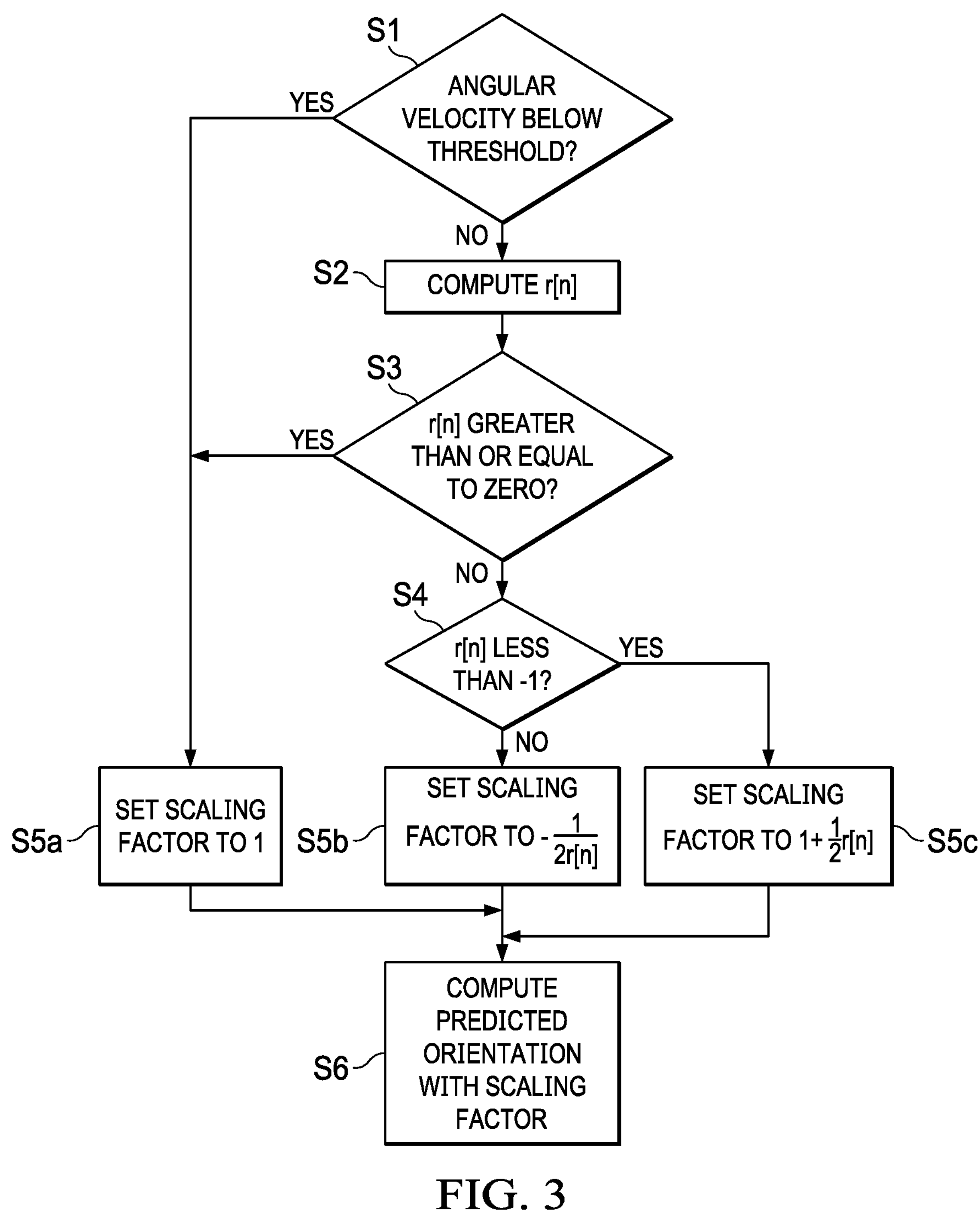
FIG. 3 is a flowchart illustrating a method for predicting a future orientation of the orientation factor according to some implementations.

With further reference to FIG. 3 a flowchart illustrating a method for selecting β[n] in accordance with one implementation is presented.

Optional step S1 comprises determining if ω[n] is below a predetermined angular speed threshold, $\omega_{min}$. For instance, $\omega_{min}$ is between 0.02 and 0.10 rad/sec or preferably around 0.05 rad/sec which is suitable for the purpose of head-tracking. If ω[n] is below the predetermined angular speed threshold $\omega_{min}$ (i.e. $|\omega[n]|<\omega_{min}$) the method goes to step S5*a* wherein β[n] selected such that β[n]=1 (indicating first order prediction) and the sesqui-order predictor is calculated at step S6 with equation 27. Otherwise, if ω[n] is above the angular speed threshold, the method goes to step S2.

Step S2 comprises calculating the value of the entity r[n] wherein $$r[n]=\frac{\alpha[n]L}{\omega[n]}, \tag{28}$$

With r[n] calculated the method goes to step S3 comprising determining if [n] is positive (i.e. if r[n]>0). If r[n] is positive this is an indication that the angular speed of the orientation tracker 100 is increasing. If r[n] is positive the method goes to step S5*a* wherein β[n] is selected such that β[n]=1 and the sesqui-order predictor is calculated with equation 27 at step S5. Otherwise, if r[n]<0, the method goes to step S4.

Step S4 comprises determining if r[n] below −1 (i.e. if r[n]<−1). If r[n]<−1 this is an indication that the angular speed of the orientation tracker 100 is decreasing with a deceleration that means that the velocity will fall to zero before sample interval n+L. If r[n]<−1 the method goes to step S5*c* wherein β[n] is selected such that $$\beta[n]=-\frac{1}{2r[n]} \tag{29}$$

and the sesqui-order predictor is calculated with equation 27 at step S6. Otherwise, if $-1 \le r[n] < 0$, the method goes to step S5*b* wherein β[n] is selected such that $$\beta[n] = 1 + \frac{1}{2}r[n] \tag{30}$$

and the sesqui-order predictor is calculated with equation 27 at step S6.

In some implementations, step S3 performed prior to step S2 (e.g. simultaneously as step S1) and step S3 is simplified to only determine whether or not the orientation tracker 100 is accelerating. If the orientation is accelerating (or the acceleration is zero) the method goes to step S5*a*. Notably, the value r[n] is then only computed when it is necessary to distinguish whether $r[n] < -1$ or $-1 \le r[n] < 0$.

Figure 4:
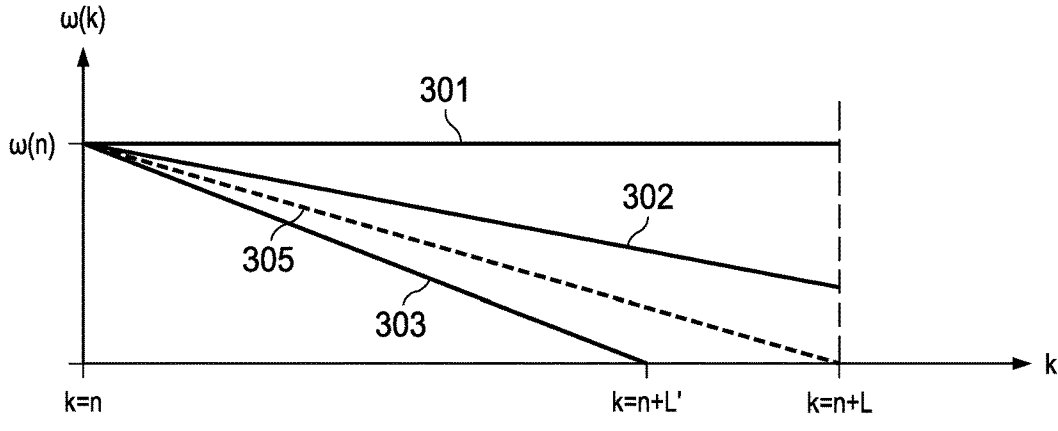
FIG. 4 is a flowchart illustrating different predictions of the angular velocity occurring during the prediction time according to some implementations.

With further reference to FIG. 4 the predicted angular velocity over the prediction samples L is illustrated. In the above, an implementation is provided wherein the value of β[n] is chosen to be β[n]=1 (thus providing a first-order prediction behavior) whenever the orientation tracking device is approximately stationary (e.g. rotating with an angular velocity below $\omega_{min}$) or is accelerating. This corresponds to the predicted angular velocity 301 which is constant from the current sample n to the predicted sample n+L.

The value of β[n] is chosen so as to provide a second-order prediction when the orientation tracker 100 is decelerating slowly with a deceleration which is insufficient to bring the angular velocity of the orientation tracker to be zero during the next L sample intervals (assuming that the acceleration will be constant for the next L sample intervals), such as when $-1 \le r[n] < 0$. This corresponds to predicted angular velocity 302 which continues to decrease with deceleration of sample n, but does not reach zero, before sample n+L.

When the orientation tracker 100 is decelerating rapidly with a deceleration which is sufficient to bring the angular velocity of the orientation tracker 100 to zero during the next L sample intervals (assuming that the acceleration will be constant for the next L sample intervals) the value of β[n] is selected provide a second-order prediction over a shorter time interval L' wherein the shorter time interval is $$L' = \frac{L}{r[n]}$$

sample periods. This corresponds the predicted angular velocity 301 continues to decrease with deceleration of sample n, reaches zero at sample n+L' and then continues with an angular velocity of zero between n+L' and n+L.

Accordingly, the deceleration threshold 305 is the most rapid deceleration which is still assigned a second order prediction over the L prediction samples whereas if the orientation tracker 100 decelerates more rapidly the prediction of the angular velocity over the L samples will be the second order prediction only up to sample n+L' and then zero until sample n+L.

In view of the above, a method for predicting the orientation of the orientation tracker 100 is provided which will use a computationally cheap first order predictor for situations when the orientation tracker 100 is accelerating or moving with a small angular speed. A more computationally costly second order predictor is reserved for situations when the orientation tracker is deaccelerating and, in situations when the orientation tracker is decelerating sufficiently fast such that the angular velocity will reach zero withing the prediction time L, the second order predictor predicts that the orientation tracker will reach an angular velocity of zero at L' and remain stationary until L.

In one implementation the value of β[n] is calculated using pseudocode segment 1:

PSEUDOCODE SEGMENT 1

```
if abs( omega[n] ) < omega_min
  beta[n] = 1
else
  r = L * alpha[n] / omega[n]
  if r >= 0
    beta[n] = 1
  else if r < -1
    beta[n] = -1 / (2 * r)
  else
    beta[n] = 1 + ½ r
  end
end
```

Instead of representing the angular velocity with a unit vector $U_{rot}(t)$ and a single rotation component ω(t) the angular velocity may be represented as a vector Ω of gyroscope values (scaled to units of radians per sample):

$$\Omega[n] = \Delta T\begin{pmatrix} Gyr_x[n] \\ Gyr_y[n] \\ Gyr_z[n] \end{pmatrix}. \tag{31}$$

It is noted that $\Omega[n] = \omega[n] \times U_{rot}[n]$ and the acceleration A[n] may thus be defined as:

$$A[n] = \Omega[n] - \Omega[n-1] \tag{32}$$

and wherein the value of r[n] may be computed as:

$$r[n] = \frac{\langle A[n], \Omega[n]\rangle}{\langle \Omega[n], \Omega[n]\rangle} \tag{33}$$

where the operator (x, y) is the dot product of two vectors x and y.

It is understood that the method of FIG. 3 described in the above may be performed analogously with the angular velocity represented with the vector Ω and with the calculation of r[n] from equation 33. Moreover, when determining at step S1 if the angular velocity Ω is below the threshold $\omega_{min}$ a comparison can be made to establish whether $$\langle \Omega[n], \Omega[n]\rangle < \omega_{min}^2.$$

If it holds that $$\langle \Omega[n], \Omega[n]\rangle < \omega_{min}^2$$

the scale factor β[n] is selected such that β[n]=1 at step S5*a*, otherwise the method goes to step S2.

In some implementations, the quaternion vectors are determined according to a simpler approximation. For instance, $\Delta Q_T[n]$ may be approximated as $$\Delta Q_T^{approx}[n],$$

which is given by $$\Delta Q_T^{approx}[n] = \begin{pmatrix} 1 - f \times \langle \Omega[n], \Omega[n] \rangle \\ \frac{1}{2}(\Omega[n])_x \\ \frac{1}{2}(\Omega[n])_y \\ \frac{1}{2}(\Omega[n])_z \end{pmatrix} \tag{34}$$

and the prediction quaternion $P_L[n]$ may be approximated as $$P_L^{approx}[n] = \Delta T \begin{pmatrix} 1 - f \times \langle \Omega[n], \Omega[n] \rangle \times (\beta[n]L)^2 \\ \frac{1}{2}\beta[n]L(\Omega[n])_x \\ \frac{1}{2}\beta[n]L(\Omega[n])_y \\ \frac{1}{2}\beta[n]L(\Omega[n])_z \end{pmatrix} \tag{35}$$

wherein the approximation scale factor f is selected from a range of $0<f<0.125$, and preferably selected from a range of $0.07<f<0.09$, and more preferably $f=0.08345$. The scale factor f is selected to compute a value for the first element of $$\Delta Q_T^{approx}[n] \text{ and } P_L^{approx}[n]$$

that ensures that the quaternion is as close as possible to a unit-vector. Experiments have shown that setting $f=0.08345$ minimizes the error over a range of angular velocities $\Omega$.

That is, the trigonometric functions $$\sin\frac{x}{2} \text{ and } \cos\frac{x}{2}$$

from equations 16 and 19 in the above may be replaced with the first term, or the first one or more terms, in their respective Taylor-series expansion which for $$\sin\frac{x}{2}$$

is simply $$\frac{x}{2}$$

(the first term) and for $$\cos\frac{x}{2}$$

is $$1 - \frac{(x/2)^2}{2!} = 1 - 0.125x^2$$

(the first two terms, wherein the first term is constant). It is further envisaged that other approximations of the trigonometric functions from equations 16 and 19 may be used to further facilitate computational efficiency.

The orientation quaternion from equation 17 may now be calculated using the approximation $$\Delta Q_T^{approx}[n],$$

by first calculating the entity $Q'_{TF}[n]$ as $$Q'_{TF}[n] = \Delta Q_F[n] \times Q_{TF}[n-1] \times \Delta Q_T^{approx}[n] \tag{36}$$

which in general is not normalized. The orientation quaternion $Q'_{TF}[n]$ may be normalized in accordance with $$Q_{TF,norm1}[n] = \frac{1}{\sqrt{Q'_{TF}[n]_w^2 + Q'_{TF}[n]_x^2 + Q'_{TF}[n]_y^2 + Q'_{TF}[n]_z^2}} Q'_{TF}[n] \tag{37}$$

or, the orientation quaternion $Q'_{TF}[n]$ may be normalized in accordance with $$Q_{TF,norm2}[n] = \frac{3 - Q'_{TF}[n]_w^2 - Q'_{TF}[n]_x^2 - Q'_{TF}[n]_y^2 - Q'_{TF}[n]_z^2}{2} Q'_{TF}[n] \tag{38}$$

to avoid the costly calculation of the square root from equation 36.

In one implementation, the current orientation, $Q'_{TF}[n]$ of the orientation tracker 100 and the quaternion representing the future orientation of the orientation tracker, $$Q_{TF}^{pred}[n+L]$$

may be determined with the pseudocode segment 2:

PSEUDOCODE SEGMENT 2

```
// Inputs:
// GyrX, GyrY, GyrZ : (radians / sample-interval)
// L : number of samples to look ahead
//
// Preserved states:
// prior_GyrX, prior_GyrY, prior_GyrZ : prior values of Gyr
// prior_Q_TF : orientation quaternion from prior sample
//
// Outputs:
// Q_TF : orientation quaternion
// Q_TF_predL : predicted future orientation quaternion
```

-continued

PSEUDOCODE SEGMENT 2

```
//
deltaQ = [ 1 − 0.08345 * (GyrX^2 + GyrY^2 + GyrZ^2),
0.5*GyrX, 0.5*GyrY, 0.5*GyrZ]
Q_TF = prior_Q_TF × deltaQ
// Optionally compute ΔQ_F[n] using Accelerometer and/or
Magnetometer
data:
deltaQ_F = calc_delta_Q_F( Q_TF )
Q_TF = deltaQ_F × Q_TF
// Approximately normalize the quaternion using equation 37
Q_TF = Q_TF * 0.5 * (3 − Q_TF[1]^2 − Q_TF[2]^2 −
Q_TF[3]^2 − Q_TF[4]^2)
omega_squared = GyrX^2 + GyrY^2 + GyrZ^2
alphaX = GyrX − prior_GyrX
alphaY = GyrY − prior_GyrY
alphaZ = GyrZ − prior_GyrZ
// Calculate Beta
if omega_squared < omega_min^2
    beta = 1
else
  r = (alphaX*GyrX + alphaY*Gyry + alphaZ*GyrZ) * L /
  omega_squared
  if r >= 0
    beta = 1
  else if r < −1
    beta = −1 / (2 * r)
  else
    beta = 1 + r/2
  end
end
// Calculate P_L
P_L = L * beta * [ 0, GyrX, GyrY, GyrZ ]
P_L[1] = 1 − 0.3338 * (P_L[2]^2 + P_L[3]^2 + P_L[4]^2)
Q_TF_predL = Q_TF × P_L // quaternion product
// Save state data for the next sample period:
prior_GyrX = GyrX
prior_GyrY = GyrY
prior_GyrZ = GyrZ
prior_Q_TF = Q_TF
```

In an alternative implementation, the scale factor β[n] is based on a previous scale factor, such as β[n−1]. If a previous value of the scale factor β[n], denoted prior_beta is added as a preserved state in pseudocode segment 2 above the pseudocode portion relating to the calculation of β[n] may be replaced with pseudocode segment 3:

PSEUDOCODE SEGMENT 3

```
beta = prior_beta
dotp = (alphaX*GyrX + alphaY*Gyry + alphaZ*GyrZ) * L
if (omega_squared < omega_min^2) || (dotp >= 0)
  beta = min(1, beta + A)
else if −dotp > omega_squared
// Approximate : beta = −omega_squared/(2*dotp)
  beta += 4 * A * ( −2*beta*dotp < omega_squared ? 1 : −1 )
  beta += 2 * A * ( −2*beta*dotp < omega_squared ? 1 : −1 )
  beta += A * ( −2*beta*dotp < omega_squared ? 1 : −1 )
else
// Approximate : beta = 1+dotp/(2*omega_squared)
  beta += 4 * A * ( −dotp < 2*omega_squared*(1-beta) ? 1 : −1)
  beta += 2 * A * ( −dotp < 2*omega_squared*(1-beta) ? 1 : −1)
  beta += A * ( −dotp < 2*omega_squared*(1-beta) ? 1 : −1)
end
```

Where the constant A is selected to provide an appropriate incremental adjustment of β[n], for example A may be selected as A=0.01. Furthermore, it is envisaged that two or more than three levels of incremental adjustment may be used and that the coefficient for each level of incremental adjustment (which in the above is 4, 2, and 1) may be selected differently. For example, four levels of incremental adjustment may be used wherein the coefficients for each level is 12, 9, 6 and 3 respectively.

Additionally, the operator "c? x:y" is short for "if c is true then x else y" where c is a Boolean, x is the consequent statement (evaluated when c is true) and y is the alternative statement (evaluated when c is false). For instance, in the first incremental level of the "else if" clause in the above pseudocode segment 3, β[n] is increased by 4A if it is true that "−2*beta*dotp<omega_squared".

Accordingly, the value of β[n] will be incrementally modified in each sample period so that the correct value is approximated over several sample intervals. That is, by performing the above incremental adjustment of β[n] a sufficiently accurate β[n] is obtained in a manner which is computationally more efficient than directly calculating r[n] using equation 33 and then directly calculate β[n] using equation 29 or equation 30.

FIG. 5*a* and FIG. 5*b* depicts a user 10 listening (e.g. using headphones 11) to a spatial audio representation comprising at least one spatial audio object 20*a*, 20*b*. The user 10 faces a first direction D in FIG. 5*a* and is presented with an associated audio presentation wherein e.g. the spatial audio objects 20*a*, 20*b* are perceived to be located in front of the user 10. As the user 10 turns his or her head to a face second direction D', different from the first direction D, the audio presentation changes accordingly such that the user 10 perceives that the audio scene has remained stationary while the user 10 has changes his or her orientation. For instance, a spatial audio object 20*a* which was perceived to be located in front and to the left of the user 10 when the user 10 faced the first direction D may be presented to the user 10 so as to appear to be straight in front of the user 10 when the user faces the new direction D'. In the scenario shown, the head of the user 10 has rotated to the left in a horizontal plane with an angle of a however it is understood that the orientation of the head of the user 10 may change by rotation around anyone of three axes when the user 10 turns, tilts or nods his or her head.

In some implementations the orientation of the user 10 tracked with an orientation tracker 100 (which e.g. is provided in the headphones 11), wherein the orientation of the user 10 as determined by the orientation tracker 100 is used to alter the audio presentation based on the orientation of the user 10. Some time is required for an audio processing system to alter the presentation in accordance with a current orientation of the user 10 (such as up to 200 milliseconds or more). Therefore, if it is determined that the user 10 faces the first direction D at first point in time $t_1$ the audio processing system initiates the process of changing the audio presentation to correspond to the user 10 facing the first direction. This processing takes some time and is completed at a second point in time $t_2$ when the user 10 is presented with an audio presentation corresponding to the user 10 facing the first direction D. However, between the first and second point in time $t_1$, $t_2$ the user 10 has moved to face a second direction D', meaning that the user is presented with an incorrect presentation which causes a distracting delay effect.

To this end, the method for predicting the orientation of the orientation tracker 100 according to some implementations may be used to predict the orientation of the user 10 and initiate the process of changing the audio presentation to correspond to the predicted orientation of the user 10. Most likely, the user 10 will be oriented with the predicted orientation when the audio presentation associated with the predicted orientation is presented, meaning that the distracting delay effect is reduced or removed entirely. Particularly, if the time required to alter the audio presentation after an orientation is known to take a certain time (e.g. a certain number of milliseconds or number of samples) the prediction time L may be adjusted accordingly. For example, if the audio processing requires x number of samples the prediction time may also correspond to x samples.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer hardware or computing system, or similar electronic computing devices, that manipulate and/or transform data represented as physical, such as electronic, quantities into other data similarly represented as physical quantities.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Note that when the method includes several elements, e.g., several steps, no ordering of such elements is implied, unless specifically stated. Furthermore, an element described herein of an apparatus embodiment is an example of a means for carrying out the function performed by the element for the purpose of carrying out the invention. In the description provided herein, numerous specific details are set forth. However, it is understood that embodiments of the invention may be practiced without these specific details. In other instances, well-known methods, structures and techniques have not been shown in detail in order not to obscure an understanding of this description.

The person skilled in the art realizes that the aspects of the invention by no means is limited to the embodiments described above. On the contrary, many modifications and variations are possible within the scope of the appended claims. For example, while the prediction of the future orientation uses computationally efficient quaternions it is envisaged that the prediction of the future orientation may be based on computed rotation matrices.

The invention claimed is:

1. A computer-implemented method for predicting a future orientation of an orientation tracker (100) for audio processing purposes, the method being performed by one or more processors and comprising:

obtaining a sequence of angular velocity samples, each angular velocity sample indicating an angular velocity of the orientation tracker (100) at a point in time;

obtaining a sequence of angular acceleration samples, each angular acceleration sample indicating an acceleration or deceleration of the angular velocity of the orientation tracker (100) at each point in time;

determining (S5*a*), for each point in time where the angular velocity is accelerating, a predicted orientation of the orientation tracker (100) after a predetermined prediction period of time based on a first order prediction of an accumulated rotation of the orientation tracker (100), where said first order prediction of the accumulated rotation is based on the accumulated rotation of the current angular velocity occurring during the prediction time;

determining (S5*c*), for each point in time where the angular velocity is decelerating, a predicted orientation of the orientation tracker (100) after a predetermined prediction period of time based on a second order prediction of the accumulated rotation of the orientation tracker (100), wherein the second order prediction of the accumulated rotation is based on the accumulated rotation of the current angular velocity and the current deceleration occurring during the prediction time, obtaining audio content;

processing the audio content based on the predicted future orientation of the orientation tracker (100) to obtain a rotated representation of the audio content; and rendering the rotated representation of the audio content to at least one loudspeaker.

2. The method according to claim 1, further comprising:

determining, for each point in time where the angular velocity is below a predetermined velocity threshold, a predicted orientation of the orientation tracker (100) after a predetermined prediction period of time based on the first order prediction of an accumulated rotation of the orientation tracker (100).

3. The method according to claim 1, wherein for each point in time where the angular velocity is decelerating with a deceleration above a deceleration threshold (305), the predicted orientation of the orientation tracker (100) after the predetermined prediction time is based on a shortened second order prediction of the accumulated rotation of the orientation tracker (100), wherein the shortened second order prediction of the accumulated rotation is based on the accumulated rotation of the current angular velocity and the current deceleration occurring during a second prediction time, wherein the prediction time is longer than the second prediction time.

4. The method according to claim 3, wherein the deceleration threshold (305) is based on the current angular speed and the predetermined prediction time.

5. The method according to claim 3, wherein the second prediction time is based on the period of time required for the orientation tracker (100) to reach an angular velocity of zero with the angular velocity and angular deceleration of the current sample.

6. The method according to claim 1, further comprising:

determining, for each point time where the angular velocity is decelerating, a scale factor;

wherein the second order prediction of the accumulated rotation of orientation tracker (100) is based on the first order prediction scaled with the scale factor.

7. The method according to claim 6, wherein the scale factor is assigned a first value for each point in time where the angular velocity is decelerating with a deceleration above the deceleration threshold, the first value being based on a first function of the current angular velocity sample and current angular acceleration sample, and wherein the scale factor is assigned a second value for each point in time where the angular velocity is decelerating with a deceleration below the deceleration threshold, the second value being based on a second function of the current angular velocity sample and current angular acceleration sample.

8. The method according to claim 6, wherein the scale factor is further based on a scale factor of at least one previous point in time.

9. The method according to claim 1, further comprising:

obtaining the sequence of angular acceleration samples by determining the sequence of angular acceleration samples based on the obtained sequence of angular velocity samples.

10. The method according to claim 1, further comprising obtaining, for each point in time, an orientation sample being indicative of a current orientation of the orientation tracker (100), and wherein the future orientation of the orientation tracker (100) is further based on the current orientation of the orientation tracker (100).

11. The method according to claim 1, wherein the future orientation of the orientation tracker (100) is relative to a floating frame of reference, and wherein the method further comprises:

obtaining an angular shift of the floating frame of reference relative to a global frame of reference, and adjusting the predicted orientation of the orientation tracker (100) with the angular shift of the floating frame of reference relative to a global frame of reference to obtain a predicted orientation of the orientation tracker (100) relative to the global frame of reference.

12. The method according to claim 1, wherein the accumulated rotation of the orientation tracker (100) is represented with a quaternion.

13. The method according to claim 1, wherein the angular velocity samples and angular acceleration samples indicate the angular velocity and angular velocity around one, two or three axes of rotation.

14. A non-transitory computer-readable storage medium comprising instructions which, when executed by one or more processors, cause the one or more processors to carry out the method of claim 1.

15. An orientation predictor system for predicting a future orientation of an orientation tracker (100) for audio processing purposes, the orientation predictor system comprising one or more processors being configured to:

obtain a sequence of angular velocity samples, each angular velocity sample indicating an angular velocity of the orientation tracker (100) at a point in time, and obtain a sequence of angular acceleration samples, each angular acceleration sample indicating an acceleration or deceleration of the angular velocity of the orientation tracker (100) at each point in time, determine, for each point in time where the angular velocity is accelerating, a predicted orientation of the orientation tracker (100) after a predetermined prediction period of time based on a first order prediction of an accumulated rotation of the orientation tracker (100), where said first order prediction of the accumulated rotation is based on the accumulated rotation of the current angular velocity occurring during the prediction time, determine, for each point in time where the angular velocity is decelerating, a predicted orientation of the orientation tracker (100) after a predetermined prediction period of time based on a second order prediction of the accumulated rotation of the orientation tracker (100), wherein the second order prediction of the accumulated rotation is based on the accumulated rotation of the current angular velocity and the current deceleration occurring during the prediction time, obtain audio content;

process the audio content based on the predicted future orientation of the orientation tracker (100) to obtain a rotated representation of the audio content; and render the rotated representation of the audio content to at least one loudspeaker.

* * * * *